United States Patent [19]

Moffitt

[11] Patent Number: 4,852,895
[45] Date of Patent: Aug. 1, 1989

[54] DOLLY

[76] Inventor: Don Moffitt, 3389 Rivendell Ct., Roswell, Ga. 30075

[21] Appl. No.: 181,674

[22] Filed: Apr. 14, 1988

[51] Int. Cl.⁴ .............................................. B62B 1/12
[52] U.S. Cl. ................................ 280/47.131; 280/63; 403/166; 403/209
[58] Field of Search ................ 280/47.13 B, 47.13 R, 280/63; 114/344; 403/166, 209

[56] References Cited

U.S. PATENT DOCUMENTS

| 1,109,520 | 9/1914 | Flower | 114/344 |
| 2,551,040 | 5/1951 | Newell | 280/63 |
| 2,733,929 | 2/1956 | Edixon | 280/35 |
| 2,919,138 | 12/1959 | Brower et al. | 280/47.13 |
| 2,953,387 | 9/1960 | Portner | 280/47.26 |
| 2,960,347 | 11/1960 | Centa, Jr. | 280/47.26 |
| 3,105,698 | 10/1963 | Bonarrigo et al. | 280/47.13 R |
| 3,272,529 | 9/1966 | Rachman | 280/47.13 |
| 4,029,327 | 6/1977 | Kolstein | 280/47.13 R |
| 4,123,819 | 11/1978 | Benedetti | 16/24 |
| 4,549,743 | 10/1985 | Shimon | 280/47.13 |
| 4,596,397 | 6/1986 | Conti | 280/47.13 R |
| 4,602,802 | 7/1986 | Morgan | 280/47.13 B |

FOREIGN PATENT DOCUMENTS

| 205413 | 2/1959 | Austria | 280/35 |
| 2900283 | 7/1979 | Fed. Rep. of Germany | 280/47.13 B |

Primary Examiner—Charles A. Marmor
Assistant Examiner—Eric Culbreth
Attorney, Agent, or Firm—Thomas & Kennedy

[57] ABSTRACT

A dolly for movably supporting one end of a load as the opposite end is hand carried. The dolly comprises a rectangular frame that defines an open space in which a lower end portion of the load may be cradled. The rectangular frame has two sections telescopically mounted one to the other whereby the width of the frame may be altered to accommodte loads of different widths by altering the position of one section with respect to the other. A pair of wheels are rotatably mounted to the frame.

2 Claims, 2 Drawing Sheets

DOLLY

TECHNICAL FIELD

This invention relates to dollies for use in manually handling and moving heavy loads such as furniture, small boats and the like.

BACKGROUND OF THE INVENTION

Dollies, trolleys and permanently mounted wheeled supports have long been used to assist people in manually moving and manipulating heavy objects such as furniture, boats, trash cans, large musical instruments and the like. Exemplary of such devices are those shown in U.S. Pat. Nos. 2,551,040, 2,953,387, 2,960,347, 3,105,698, 4,029,327, and 4,596,397. Typically, those of the fixedly attachable type comprise a support frame movably supported on a pair of wheels together with means for securing the device to a lower portion of the load such as to a dependent flange. The dolly types, which are not fixedly secured, have commonly had an upright back support mounted to wheels with a short bottom flange or foot formed at a right angle to the upright support. By placing the bottom of a load on the foot and tilting the dolly so that a side of the load rests against the upright support, the load may be lifted from a supporting floor for movement.

In most of the fixedly mounted type devices shown in the aforementioned patents the load supported by them, though heavy enough to need wheeled assistance, have been relatively small. Exemplary of such loads are garbage cans, trash bags and bass violin cases. They have commonly been secured to the load by the use of wrenches used to draw coupling members together or apart. Since the loads have not been exceedingly large, the support devices have been normally designed only to support their bottom surface.

Dollies, on the other hand, which are not designed to be fastened to loads, are well suited for those situations that require the movement of a number of large articles to each of which they are only mounted individually for a brief period of time while being moved. For example, professional movers may use one or two dollies for a job that requires may articles to be moved. Dollies heretofore have had to be versatile and to be readily mountable and dismountable to various articles of various sizes, shapes and weights. Many of the prior art type of dollies are ill suited for the task. This is because many do not provide sufficiently stable support in that they support only the bottom surface of the load and not their sides. To use the other fastenable type of devices however would mean having to use tools to mount and dismount them to each article. This would be a time consuming task and would incur the risk of marring or scratching the articles. Furthermore, since dollies are normally available only in some two or three sizes, their size is selected as a compromise in order to accommodate loads of average weight and size. Thus, for very large loads it has sometimes occurred that professional movers have had to use two dollies for a single article which is difficult to do effectively and without creating a hazardous situation.

Accordingly, it is seen that a need has long existed for a dolly which can be readily mounted and dismounted to sizable loads without the need of tools and yet which can provide ample support to both the bottom and sides of loads and to loads of different sizes. It is to the provision of such a dolly that the present invention is primarily directed.

SUMMARY OF THE INVENTION

In one form of the invention a dolly is provided for movably supporting one end of a load as the opposite end is hand carried. The dolly comprises a rectangular frame that defines an open space in which the lower end portion of the load may be cradled. The frame has at least two sections which have elongated portions that are telescopically mounted one to the other whereby the width of the frame may be altered to accommodate loads of different widths by altering the position of one section with respect to the other. A pair of wheels is rotatably mounted to the frame.

In another form of the invention a dolly is provided for movably supporting an end of a load. The dolly comprises a frame that has two substantially parallel arms linked together at their ends by two legs to define an open space in which a bottom end portion of the load may be cradled. A pair of wheels is rotatably mounted to opposite ends of one of the arms.

DETAILED DESCRIPTION

Figure 1:
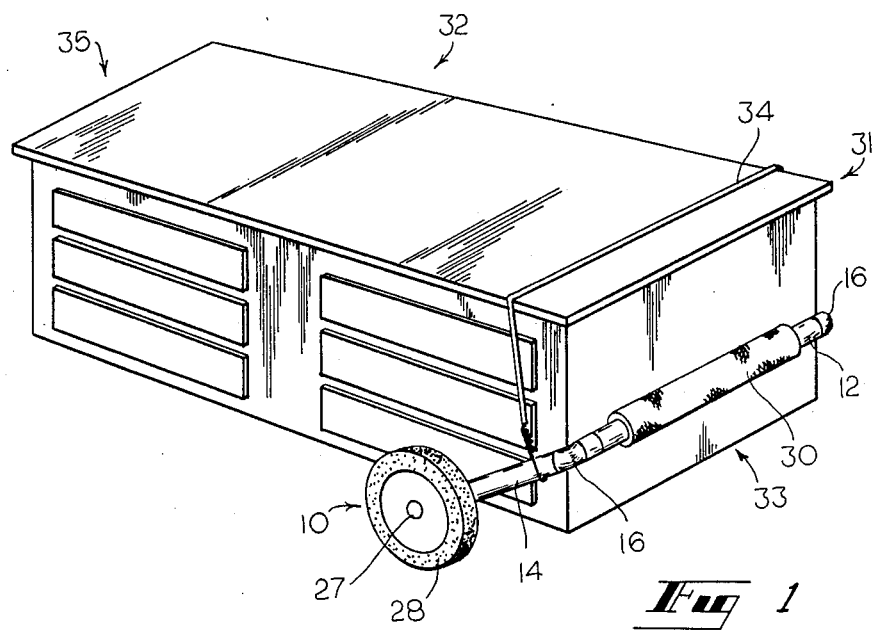
FIG. 1 is a perspective view of a dolly that embodies principles of the invention and which is shown supporting an article of furniture for movement.
Figure 2:
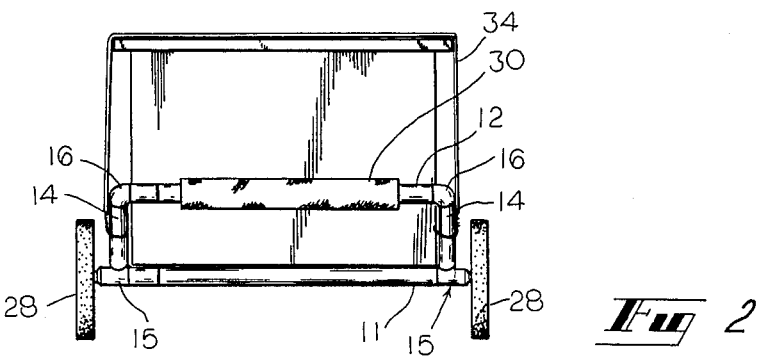
FIG. 2 is an end view of the dolly and furniture shown in FIG. 1.
Figure 3:
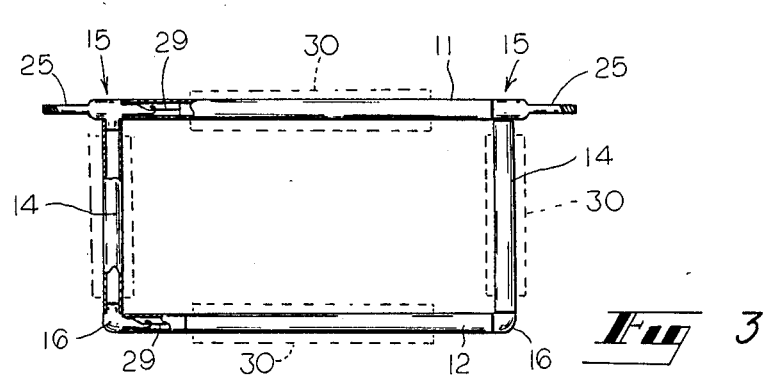
FIG. 3 is a side view of the dolly of FIG. 1 shown detached from the article of furniture and with a portion of the dolly shown in cross section to reveal internal components and with associatable pads shown in broken lines.

With reference next to the drawings, there is shown in FIGS. 1–4 a dolly 10 of tubular, framelike construction. The dolly has a lower arm 11 and an upper arm 12 which is parallel to the lower arm. The ends of the arms are joined by two parallel legs 14. Adjacent ends of the arms and legs are connected by two corner keys 15 and two other corner keys 16. Specifically, the lower arm 11 is connected to the two legs 14 by two corner keys 15 while the upper arm 12 is connected to the other ends of the two legs by two corner keys 16.

Figure 4:
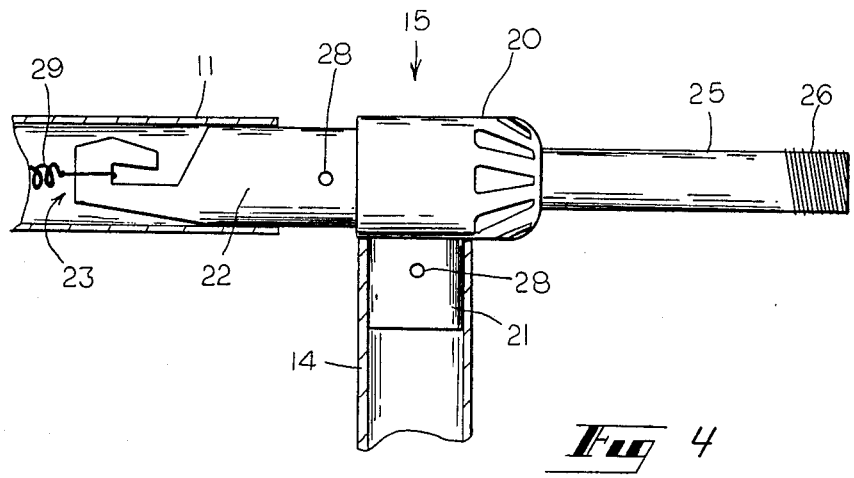
FIG. 4 is an enlarged, cross-sectional view of one corner key component of the dolly illustrated in FIGS. 1–3.

With reference specifically to FIG. 4, each of the two corner keys 15 is seen to comprise a cylindrically shaped main body 20 from one side of which a cylindrical lug 21 radially extends. Another lug 22 projects axially from the body 20. The end of the lug 22 located distally from the main body 20 is formed with a hook 23. The outside diameter of the lugs 21 and 22 are sized to be telescopically received within the tubular arms and legs in telescopic fashion. An axle 25 extends axially from the other end of the cylindrical body 20. Its end is provided with threads 26 to which an end cap 27 is threaded after a wheel 28 has been rotatably mounted to the axle. The corner keys 16 are of a construction quite similar to that of keys 15 except they are not provided with the axles 25.

Each lug 21 and 22 is also seen to be formed with a rivet hole 28 for selectively securing the lug to a tubular arm and leg. Specifically, the lugs 21 of all four of the corner keys are preferably mounted by riveting or swaging to the legs 14. The two corner keys 15 mounted to opposite ends of one leg may alternatively be also riveted to swaged to their associated arms 11. At least one corner key 15 and one corner key 16 secured to opposite ends of one leg however is not rigidly secured to the arms 11. These two keys, in combination with the single leg to which they are secured, form a generally C-shaped component. Alternatively, the other corner key 15 and 16 may also be fixedly secured only to the opposite ends of the other leg to form a second C-shaped component that is not rigidly joined to its associated arms.

A tension spring 29 is positioned within each of the arms 11 with its ends attached to the hooks 23 of the corner keys. A protective, tubular pad 30 is preferably mounted about each of the arms and legs of the dolly. For clarity of illustration, all four pads have not been illustrated in all of the figures of the drawing.

In FIG. 1 the dolly 10 is shown movably supporting an end 31 of a desk 32. To place it in this support position the legs 14 are pulled apart against the force of the springs 29 to provide a spaace sufficient to receive the desk end. The desk end 31 is then momentarily lifted and its bottom or corner 33 positioned upon the lower arm 11 within the space bounded by the dolly arms and the spread legs. The legs are then released whereupon they converge upon the sides of the desk. A safety strap 34 in the form of a stretch cord is then looped over the top of the furniture and hooked to the legs 14, so aslo shown in FIG. 1. The other end 35 of the desk may now be lifted and the desk moved about partially supported by the dolly. To dismount the furniture from the dolly the desk end 35 is set down, the end 31 lifted, and the legs pulled apart. The dolly is then removed and the end of the load that the dolly supported then also set down.

Figure 5:
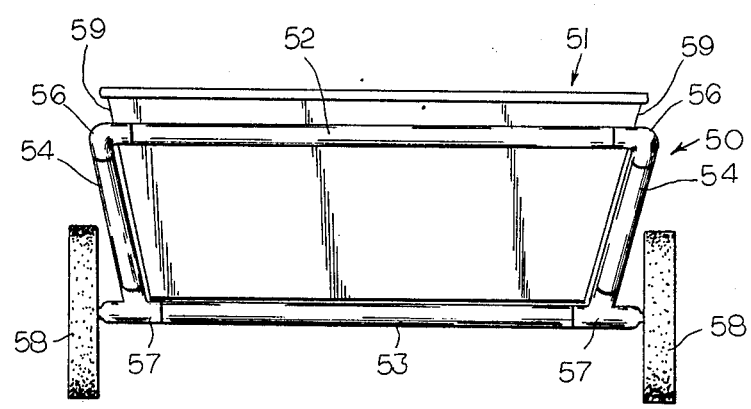
FIG. 5 is a an end view of a dolly embodying principles of the invention in an alternative form shown movably supporting an end of a small boat.

In reference next to FIG. 5 a dolly 50 that embodies principles of the invention is shown supporting a boat 51. Again, the dolly has an upper arm 52, a lower arm 53 and two connecting legs 54. The upper arm 52 is connected to the legs by corner keys 56 while the lower arm 53 is connected to the legs by corner keys 57. A pair of wheels 58 is rotatably mounted to the corner keys 57 as in the previously described embodiment. Thus, the dolly 50 is of essentially the same construction as that of the dolly 10 with the exception that the legs 54 are not mutually parallel but rather extend divergently from the lower arm 53 to the upper arm 52. This is done to accommodate the sloping sides 59 of the stern of the boat 51. Thus, one of the lugs of each of the corner keys extends at an eschewed angle rather than at a right angle with respect to the axis of the key. Mounting and dismounting of the boat from the dolly is accomplished as previously described.

It thus is seen that a dolly is now provided that overcomes problems long associated with those of the prior art. It should be understood however that the just described embodiments merely illustrate principles of the invention in two preferred forms. Many modifications, additions and deletions may therefore be made without departure from the spirit and scope of the invention as set forth in the following claims.

I claim:

1. A dolly for movably supporting an end of a load, and with the dolly comprising a frame having two substantially parallel arms linked together at their ends by two legs to define an open space in which a bottom end portion of a load may be cradled, and a pair of wheels rotatably mounted to opposite ends of one of said arms, said legs being fixed in length and said arms being adjustable in length whereby one dimension of said open space is altered to accommodate loads of different widths upon adjustment of the length of said arms, a pair of wheels rotatably mounted to said frame, spring means for biasing said adjustable arms to predetermine lengths, a corner key fixedly secured to one end of one of said legs and telescopically mounted to one end of one of said arms, and wherein said corner key has an axle to which one of said wheels is rotatably mounted and is formed with a hook located within an end portion of said one arm, and wherein said spring means has a tension spring mounted to said corner key hook, whereby a corner of the load may be nestled in the opening defined by the frame with the bottom of the load resting on one of the dolly arms and with the other dolly arm positioned on an end of the load, and with the width of the frame being adjusted to nest the load firmly to the dolly.

2. A dolly for movably supporting an end of a load, and with the dolly comprising two arms and two legs linked at their ends by corner keys to define an open space in which a bottom end portion of a load may be cradled, a pair of wheels rotatably mounted to opposed corner keys at opposite ends of one of said arms, spring means for biasing said dolly to a predetermined width, and wherein at least one of said corner keys includes a hook located within its corresponding arm and wherein said spring means includes a tension spring mounted to said corner key hook.

* * * * *